Nov. 8, 1960     L. H. MORIN     2,958,904
METHOD OF FORMING AND TRIMMING MOLDED CORED PLASTIC PRODUCTS
Filed June 22, 1953     2 Sheets-Sheet 1
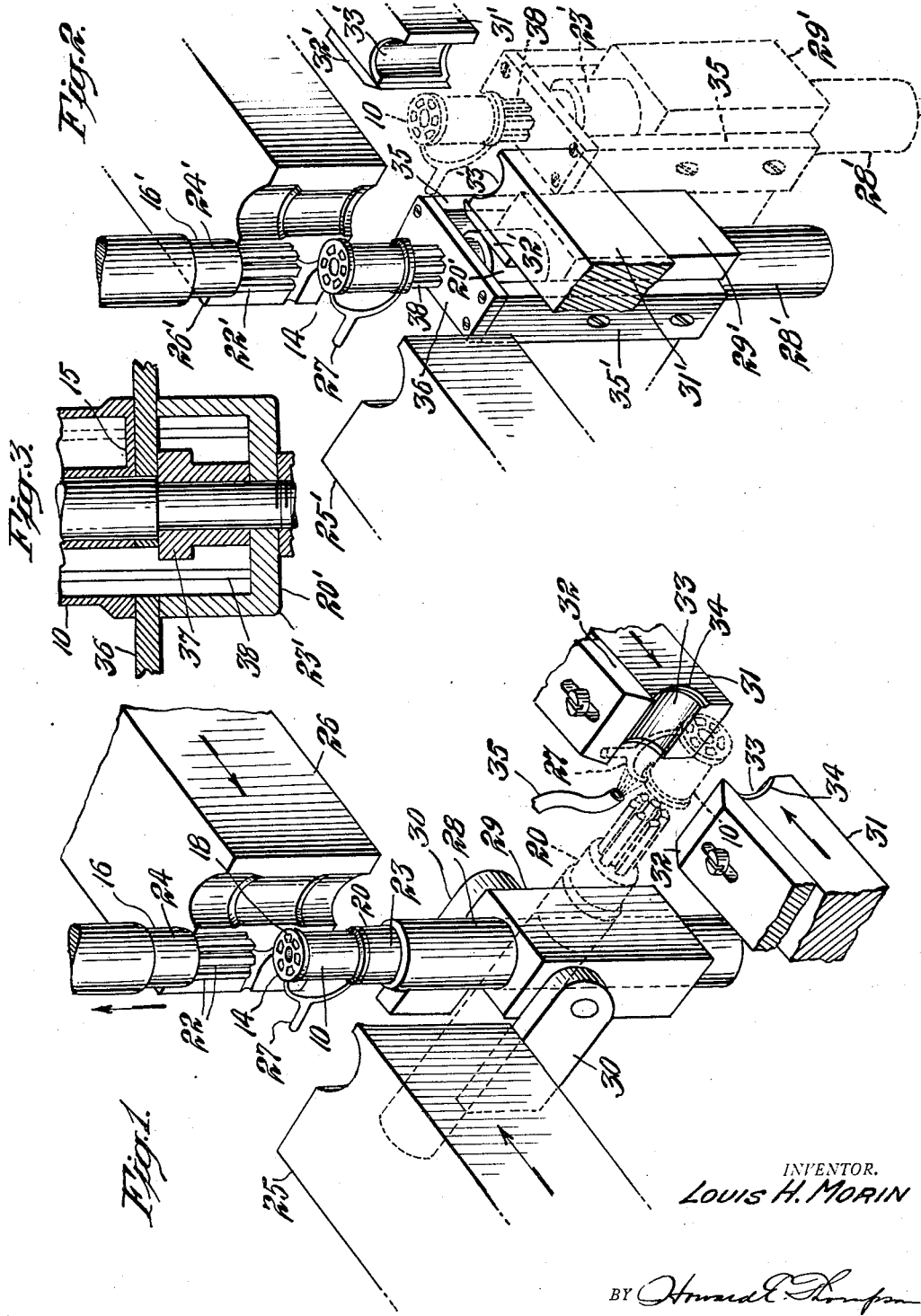
INVENTOR.
LOUIS H. MORIN
BY Howard C. Thompson
ATTORNEY

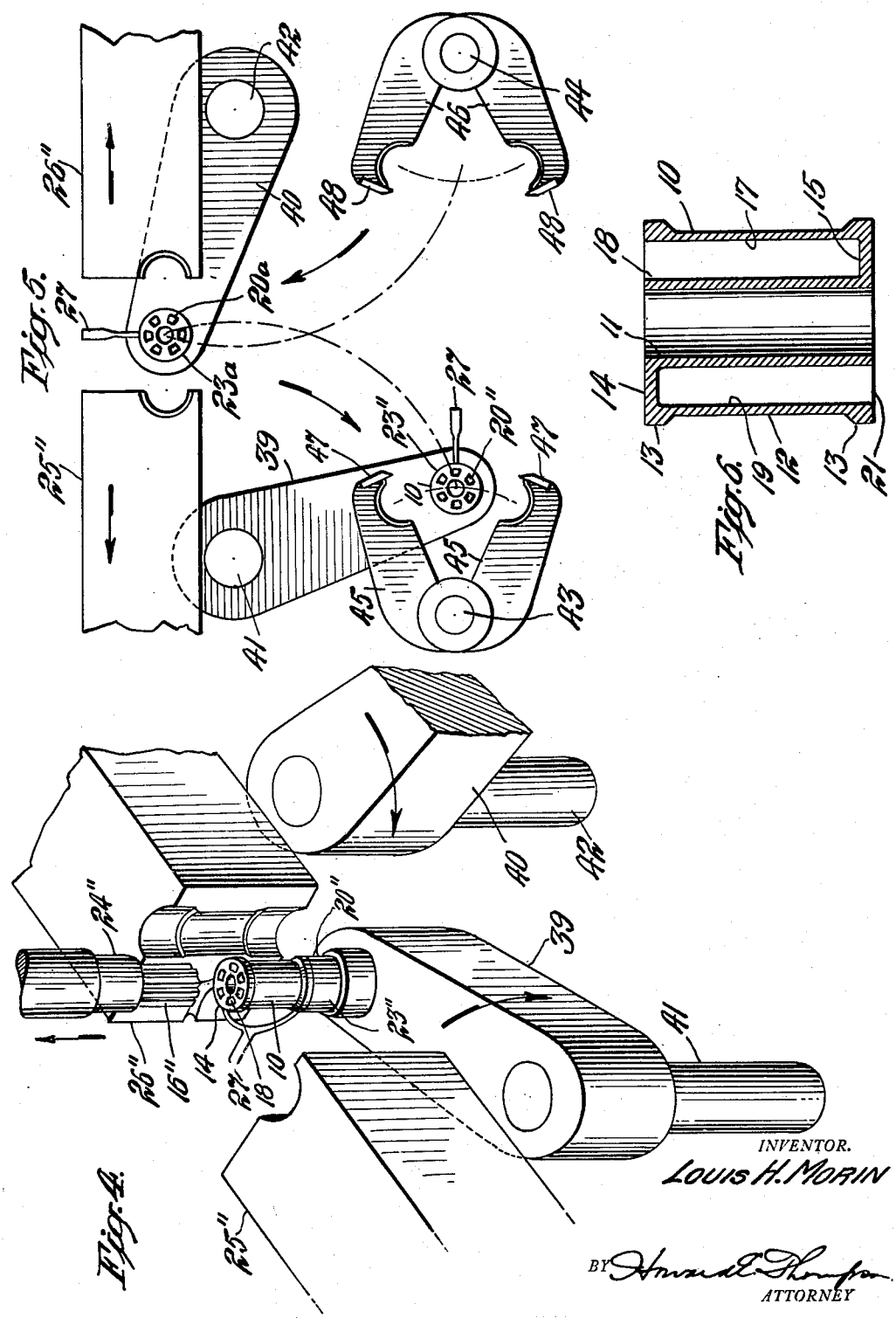

United States Patent Office 2,958,904
Patented Nov. 8, 1960

2,958,904

METHOD OF FORMING AND TRIMMING MOLDED CORED PLASTIC PRODUCTS

Louis H. Morin, Bronx, N.Y., assignor to Coats & Clark, Inc., New York, N.Y., a corporation of Delaware Filed June 22, 1953, Ser. No. 363,282

7 Claims. (Cl. 18—47.5)

This invention relates to the formation of cored plastic products such for example as a thread spool. More particularly, the invention deals with a method of forming and trimming products of this type and kind wherein one of the cores of a pair of core units is utilized as a means for moving the molded product to and supporting the same at a trimming station in the operation of trimming the product.

Still more particularly, the invention deals with a method wherein one of the cores of a pair of cores employed is duplicated so that the duplicate cores are intermittently moved into the molding station and trimming station whereby a product can be molded while a previously molded product is trimmed at the trimming station.

The novel features of the invention will be best understood from the following description when taken together with the accompanying drawings, in which certain embodiments of the invention are disclosed, and in which the separate parts are designated by suitable reference characters in each of the views, and in which:

Fig. 1 is a diagrammatic perspective view illustrating one type of coring and core operation in the molding and trimming of a thread spool;

Fig. 2 is a view similar to Fig. 1 showing a modified form of a method of operation of the core utilized to move the molded product from the molding station to the trimming station;

Fig. 3 is an enlarged sectional view through part of the core and molded product produced in accordance with the teachings in Fig. 2 showing the parts in a different position;

Fig. 4 is a diagrammatic perspective view similar to Fig. 1 illustrating the use of dual core units in one unit of a pair of cores, part of the construction being broken away;

Fig. 5 is a plan view of the structure as seen in Fig. 4 showing the two dual cores and illustrating the trimming station in conjunction with which the dual cores operate; and Fig. 6 is a sectional view through a spool product such as shown in Figs. 1 to 5 inclusive, illustrating the coring of the spool product.

For the purpose of illustrating one adaptation and use of my invention, I have illustrated in the accompanying drawings the molding and trimming of one product, such for example as a thread spool, it being apparent that the method as herein described is applicable to the molding and trimming of any type or kind of cored product wherein the core, or at least one of the cores, can be utilized as a means for delivering the molded product 2 and for supporting the same at a trimming station in the operation of trimming the gate or sprue from the molded product.

To understand the present disclosure, in Fig. 6 of the drawing I have shown a molded thread spool 10 having an inner tube 11 and an outer tube 12, the tube 12 terminating at its ends in bevelled rim portions 13. The inner and outer tubes 11 and 12 are integrally joined in end wall portions 14, 15, and for the sake of description it can be said that the end wall portion 14 is at the upper end of the spool whereas the end wall portion 15 is at the lower end of the spool.

As the same spools are used in the several illustrations, the cores associated with these spools will be correspondingly identified as the upper and lower cores. The upper cores, such for example as the core 16 of Fig. 1 of the drawing, 16' of Fig. 2, and 16" of Fig. 4, form the passages or openings 17 in the spool 10 which are closed by the end walls 15, the cores being pulled upwardly through the molded spool leaving in the end walls circumferentially spaced openings 18 which register with the passages 17. Similar passages 19 are formed by the lower cores 20 of Fig. 1, 20' of Fig. 2, and 20" of Fig. 4. In referring to the cores 16, 20 as cores, they should be better termed core units, and in Figs. 4 and 5 the bottom core units 20" are duplicated and the duplicate unit is identified by the reference character 20a, the purpose of which will be later described, and these bottom cores 20, 20' 20" and 20a form openings 21 between the bottom walls 15 as will be apparent.

In other words, when both of the core units are brought together, the core elements of the units which form the passages 17 and 19 terminate short of what might be termed the head end of the units to provide the space which forms the end walls 14 and 15. For example, in Fig. 1 the core elements 22 of the core unit 16 are shown, similar elements 22' are shown in Fig. 2, and other elements 22" in Fig. 4 of the drawings. These elements terminate short of the heads 23, 23', 23" and 23a of the lower core units 20, 20', 20" and 20a. The core elements of the latter units are not disclosed except in the showing of Fig. 2, but it will be understood that the core elements of such lower units also terminate short of the heads 24, 24' and 24" of the units 16, 16' and 16" in forming the end walls 14.

In the several figures, I have shown diagrammatically the dies or molds which operate in conjunction with the core units in forming the resulting spool, and these are identified in Fig. 1 by the reference characters 25, 26, in Fig. 2 by the reference characters 25', 26', and in Figs. 4 and 5 by the reference characters 25", 26".

In the several figures, and with the exception of Fig. 3 of the drawings, the parts are shown in open position to clearly illustrate diagrammatically the method of procedure in the formation of the product and movement of one of the core units to bring the product to the trimming station to trim or remove the gate or sprue 27 therefrom.

In the several figures, the method of supporting and actuating the lower core differs, and for this reason each showing will be dealt with separately.

In Fig. 1 of the drawing, the unit 20 is mounted on a shaft or spindle 28 which is suitably actuated in movement of the core unit 20 into registering position between the dies at the casting station and in withdrawing the cores from the finished product, as diagrammatically illustrated in dotted lines in said figure. The shaft or spindle 28 is slidably mounted in a block 29 pivoted in a pair of arms 30 so that the block, including the shaft 28, can be swung from the full line position of Fig. 1 to the dotted line position, the dotted showing of the block being omitted in Fig. 1 simply to simplify the diagrammatic showing.

At one side of and below the molding station defined by the dies 25 and 26 is a trimming station comprising two product engaging members 31 and trimming tools 32. The members 31 have sockets 33 for receiving the molded spool 10 and these sockets have grooved sides as at 34 to engage the rims 13 of the spool to hold the spool against movement in the operation of withdrawing the core unit 20, the core unit being indicated in the withdrawn position, whereupon the members 31 open and an air blast tube 35 is employed to blow the trimmed gate 27 to one side, allowing the trimmed spool to drop into a suitable receptacle arranged beneath the members 31. After the product has been trimmed, the block 29 including the shaft 28 with the core unit 20 thereon is again swung into the raised position shown in full lines. The upper core 16 is moved into interfitting engagement with the lower core unit, after which the dies are closed around the assembled core units. The plastic material is then pressure injected into the mold cavity which results in the formation of the spool 10 including the gate 27 whereupon the upper core unit 16 is raised, the dies are separated, and then the above operation of swinging the core unit 20 to bring the spool in registering position at the trimming station takes place.

In Figs. 2 and 3 of the drawings, the shaft or spindle 28' which supports the core unit 20' is arranged in a block 29' generally similar to the block 29, but the block is suitably supported and operated to move horizontally instead of to swing on the pivot arm such as the arms 30. The structure of Figs. 2 and 3 is further modified to the extent of providing side plates 35 and 35' on the block 29', which plates support at their upper end a stripper plate 36 which is arranged above the head 20' of the core unit 23. In other words, the core elements of the unit 20' will be slightly longer so that the stripper plate 36 forms part of the end of the mold in forming the lower end wall portions of the spool similar to the end wall 15 of Fig. 6, which end wall is also indicated in Fig. 3 of the drawings. In this figure, the lower end portion of the spool 10 shown in Fig. 6 is illustrated.

In Fig. 3 of the drawings, I have also diagrammatically shown the bushing mounting 37 for the core elements 38 of the lower core unit 20', the bushing keying the core elements 38 in the head 23'. The stripper plate 36 serves to facilitate stripping of the core elements 38 partially from the molded spool 10 prior to the movement of the spool, including the unit 20', shaft 28' and block 29' into position at the trimming station, as indicated in dotted lines in Fig. 2 of the drawing. At the trimming station a pair of members 31' generally similar to the members 31, except that the cutters or trimming tools 32' are disposed at the side of the members 31' rather than on the top thereof as shown in Fig. 1.

It will appear from a consideration of Fig. 2 that the spool 10 when at the trimming station is supported at the outer ends of the core elements 38, and this positioning on the elements 38 will be such as to maintain the spool 10 in proper alignment with respect to the sockets 33' of the members 31'.

Aside from the method of moving the lower core unit support, the operation of the structure as shown in Figs. 2 and 3 will be the same as that shown in Fig. 1, and for this reason will not be repeated.

In Figs. 4 and 5 of the drawings, the structure in the support of the lower core unit has been materially modified to the extent that these core units include supports in the form of an arm 39 for support of the core unit 20'', and an arm 40 for support of the associate core unit 20a. The arms 39 and 40 are mounted on rotary reciprocating pins 41 and 42 respectively, so that intermittently the core unit 20'' and the core unit 20a are moved into position at the molding station or, in other words, between the dies 25'', 26'', and then into two pairs of trimming tools 43 and 44, each defining a trimming station. The trimming tools 43 comprise a pair of opening and closing jaws 45, whereas the tools 44 comprise a similar pair of jaws 46. The jaws 45 and 46 are generally similar in construction to the members 31, 31', the jaws 45 having trimming tools 47, whereas the jaws 46 have trimming tools 48.

In Fig. 5 of the drawings, the arm 40 is shown supporting the core unit 20a at the molding station whereas the arm 39 shows the core unit 20'' with a molded spool 10 thereon at the trimming station defined by the jaws 45. While the product is being molded on the core unit 20a, a previously molded product is trimmed to remove the gate or sprue 27 at the station 43 and by operation of the jaws 45. In the next cycle of operation, the arms 39 and 40 are actuated to bring the core unit 20a with a molded spool thereon into position at the trimming station 44, while the core unit 20'' is moved into position at the molding station, which position of the arm 39 is illustrated in Fig. 4 of the drawings.

After the spool has been molded on the core 20'' and the spool trimmed at the station 40, the above operation is reversed, namely, the arm 40 is swung to the position shown in Fig. 5 and the arm 39 swung to the position shown in said figure, and the above cycle of operation is repeated.

It will be understood that suitable means will be provided to remove the trimmed spool from the cores at the trimming stations when the jaws 45 and 46 are in open position.

With the several forms of construction diagrammatically shown, it will be apparent that the product, such for example as a thread spool, is first formed at the molding station and then moved by one of the core units to a trimming station, at which station the product is supported by the core until the trimming tools have trimmed the product, after which the product is removed from the core unit and the latter is returned to the molding station for the formation of another product. With the structure shown in Figs. 4 and 5 and by duplicating one of the core units, the speed of production can be increased over the method as disclosed in Figs. 1 and 2 of the drawings.

It will be apparent that in some cases single core units will be employed in the molding of products according to my improved method, but where two core units are employed as illustrated in the accompanying drawings, the one core unit is first withdrawn from the molded product before the dies are separated, whereupon the dies separate and the other core unit then delivers the product to the trimming station and in some instances, as for example illustrated in Fig. 2 of the drawings, the other or second mentioned core unit can be partially withdrawn from the product while the product is at the casting station or during transfer of the product from the casting station to the trimming station.

In connection with this latter statement, it will be apparent that with the method as shown in Fig. 2 of the drawings, the lower core unit has been partially removed from the spool while the spool is still within the die, and the stripper plate 36 operates to strip the product from the core elements 38 after the gate or sprue 27 has been trimmed from the product.

In another method of procedure, the core elements 38 could be drawn down through the plate 36 with the lower surface of the spool arranged upon the upper surface of the plate 36, and with the parts in this position the product could be moved to the trimming station, and then after the trimming operation the core elements 38 could be wholly withdrawn from the spool, the stripper plate supporting the lower surface of the spool in the latter operation.

Having fully described my invention, what I claim as new and desire to secure by Letters Patent is:

1. The herein described method of forming cored molded spools, which consists in arranging a pair of interfitting core units in opposed relationship to each other between a pair of relatively movable dies, each core unit comprising a head having a group of core elements extending therefrom, disposing free ends of the core elements of each unit in spaced relation to the head of an opposed unit, then closing the dies upon said interfitting core units, then pressure injecting heated molding material into the dies to form on said core units a molded spool body having an integral sprue and comprising inner and outer tubes joined by end wall portions, forming said end wall portions at the ends of the core elements of said core units, then withdrawing one of the core units including the elements thereof from the molded spool while supported in said dies, then separating the dies and moving the other core unit with the molded spool and integral sprue thereon outside the plane of the path of the dies and into a position between a pair of gripping and trimming tools at a trimming station, then actuating said tools to grip and simultaneously trim the molded spool, then withdrawing the second named core unit from the molded spool while gripped by said tools, and then separating said tools to deliver the cored and trimmed molded spool.

2. The method of producing molded spools on a pair of interfitting, oppositely supported core units disposable in the mating cavities of a pair of relatively movable dies at a casting station, each spool comprising inner and outer tubes joined by end wall portions, said core units being relatively movable toward and away from each other along an axis which passes through both units, each unit comprising a group of circumferentially spaced, longitudinally extending core elements which are interengageable with the elements of the opposite unit to help form said inner and outer tubes, said method comprising pressure injecting molding material into the die cavities to form on the interfitting core units a molded spool including a sprue, withdrawing one of the core units from the molded spool and from the closed dies while the spool is held therein, separating the dies leaving the molded spool supported on the other core unit, moving said other core unit and the spool thereon to a trimming station, clamping the spool at said trimming station between a pair of gripping and trimming members to hold the spool and to simultaneously trim the sprue therefrom, moving said other core unit to withdraw the same from the trimmed spool while held by said members, and then separating said members to deliver the trimmed spool.

3. The method of claim 2 wherein said other core unit at the casting station, after said one core unit is withdrawn and before the dies are separated, is partially withdrawn from the molded spool and from the closed dies while the spool is held within the closed dies, and wherein said other core unit is completely withdrawn from the trimmed spool while the latter is held by said members at the trimming station.

4. In a method of producing cored and timmed molded products on a pair of interfitting core units disposable in the mating cavities of a pair of relatively movable dies, wherein said core units are relatively movable toward and away from each other along an axis which passes through both units, and wherein molding material is pressure injected into the die cavities to form on the interfitting core units a molded product including a sprue, the improvement comprising withdrawing one of the core units from the molded product and from the closed dies while the product is held therein, separating the dies leaving the molded product supported on the other core unit, moving said other core unit and the molded product thereon to a trimming station, engaging the molded product between a pair of gripping and trimming members to hold the product and to simultaneously trim the sprue therefrom, withdrawing said other core unit from the product and gripping members to strip the same from the trimmed product while held by said members, and then separating said members to deliver the trimmed product.

5. In a method of producing cored and trimmed molded products on a pair of interfitting core units disposable in the mating cavities of a pair of relatively movable dies, wherein said core units are relatively movable toward and away from each other along an axis which passes through both units, and wherein molding material is pressure injected into the die cavities to form on the interfitting core units a molded product including a sprue, the improvement comprising withdrawing one of the core units from the molded product and from the closed dies while the product is held therein, opening the dies leaving the product supported on the second core unit, moving said second core unit and the product thereon to a trimming station, engaging the product between a pair of gripping and trimming members to hold the product and to simultaneously trim the sprue therefrom, stripping said second core unit from the trimmed product while held by said members, separating said members to deliver the trimmed product; and coincidently with said moving, engaging, stripping, and separating steps, moving said first core unit and a third core unit interfittable therewith to a position between the cavities of the open dies, closing the dies and pressure injecting molding material into the die cavities to form on the interfitting first and third core units a second molded product including a sprue, withdrawing said first core unit from the second product and from the closed dies while said second product is held therein, opening the dies leaving the second product supported on the third core unit, moving said third core unit and the product thereon to a second trimming station spaced from said first trimming station and outside the plane of the path of the dies, engaging the second product between a second pair of gripping and trimming members to hold said product and to simultaneously trim the sprue therefrom, stripping said third core unit from the second product while held by said members, separating said members to deliver the second product; and, coincidently with said steps following the movement of the third core unit and second product to said second trimming station, moving said first and second core units to said position between the die cavities preparatory to forming another product.

6. The method of producing molded spools on a pair of interfitting, oppositely disposed core units that interfit with each other in the mating cavities of a pair of relatively movable dies, said core units being relatively movable toward and away from each other along an axis which passes through both units, said pair of core units being alternately formed by interfitting a first core unit with a second core unit and then interfitting said first core unit with a third core unit, said method comprising pressure injecting casting material into the die cavities to form on the interfitting first and second core units a molded spool including a sprue, withdrawing the first core unit from the spool and from the closed dies while the spool is held therein, separating the dies leaving the spool supported on the second core unit, moving said second core unit and the spool thereon to a trimming station where the spool is trimmed and said second core unit is withdrawn from the spool; and, coincidently with said movement of the second core unit and spool to the trimming station, moving the first and third core units into position between the cavities of said dies, closing the dies and pressure injecting casting material into the die cavities to form on the interfitting first and third core units a second molded spool including a sprue, withdrawing the first core unit from said second spool and from the closed dies while the second spool is held therein, separating the dies leaving the second spool supported on the third core unit, moving said third core unit and the spool thereon to a trimming station where the sprue is trimmed from the spool and the third core unit is withdrawn from the spool; and, coincidently with said last named moving step, moving said first and second core units into position between the die cavities preparatory to forming another spool.

7. The method of producing molded spools on a pair of oppositely disposed, relatively movable core units that interfit with each other in the mating cavities of a pair of relatively movable dies, which comprises interfitting a first core unit with a second core unit between said die cavities, pressure injecting casting material into the die cavities to form on the interfitting first and second core units a molded spool including a sprue, withdrawing the first core unit from the spool and the dies leaving the spool supported on the second core unit, moving said second core unit and the spool thereon to a trimming station and coincidently therewith interfitting said first core unit with a third core unit between said die cavities, pressure injecting casting material into the die cavities to form on the interfitting first and third core units a second molded spool including a sprue, withdrawing the first core unit from the spool and dies leaving the spool supported on the third core unit, moving said third core unit and the spool thereon to a trimming station and coincidently therewith moving said first and second core units to said die cavities to form another spool.

References Cited in the file of this patent
UNITED STATES PATENTS

| | | |
|---|---|---|
| 2,353,825 | Hofmann | July 18, 1944 |
| 2,367,303 | Morin | Jan. 16, 1945 |
| 2,428,174 | Morin | Sept. 30, 1947 |
| 2,479,695 | Morin | Apr. 23, 1949 |
| 2,671,933 | Nye | Mar. 16, 1954 |